(No Model.)  2 Sheets—Sheet 1.
J. W. ELLS.
MANUFACTURE OF NAILS.
No. 438,371.  Patented Oct. 14, 1890.
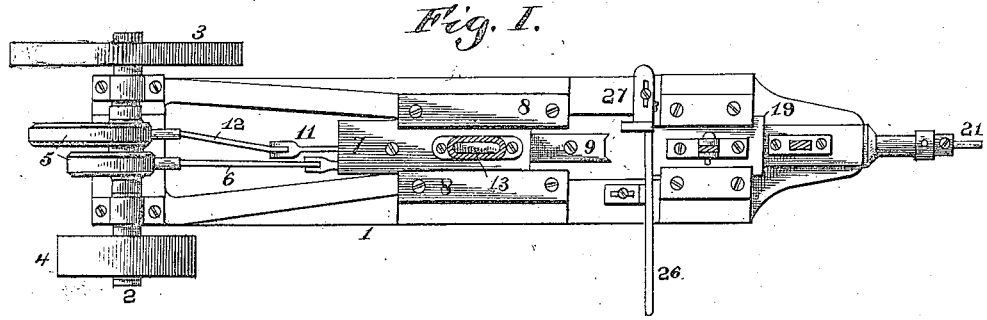
Fig. I.
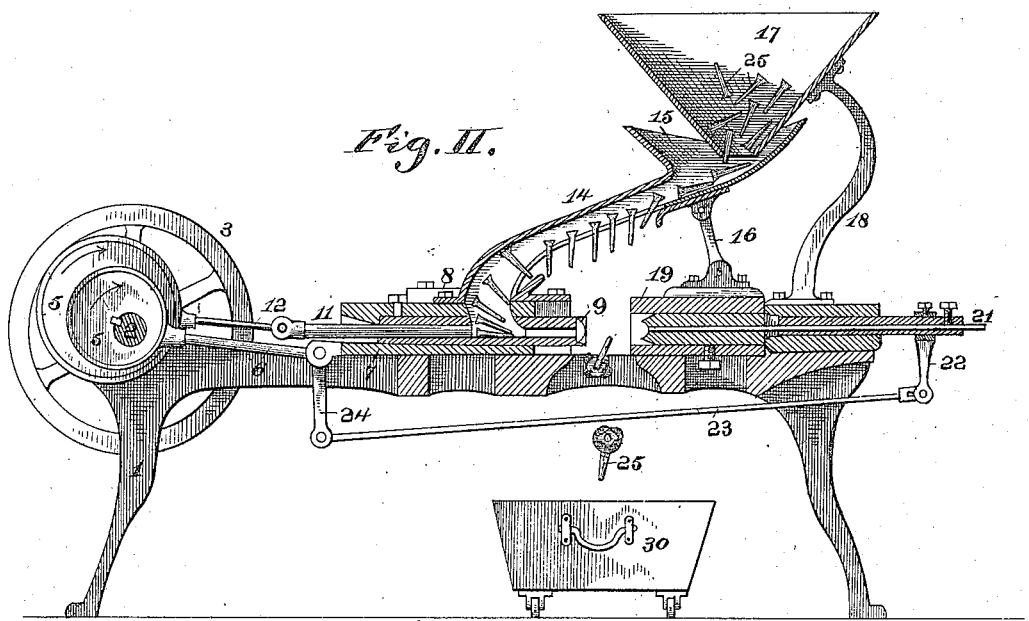
Fig. II.
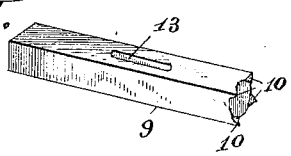
Fig. III.
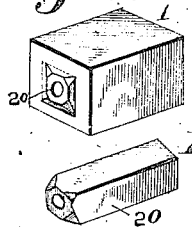
Fig. IV.
Fig. V.
Witnesses:
J. B. McGirr
W. J. Boernham
Inventor:
Josiah W. Ells
By his Attorney
Joseph R. Edson (No Model.) 2 Sheets—Sheet 2.
J. W. ELLS.
MANUFACTURE OF NAILS.
No. 438,371. Patented Oct. 14, 1890.
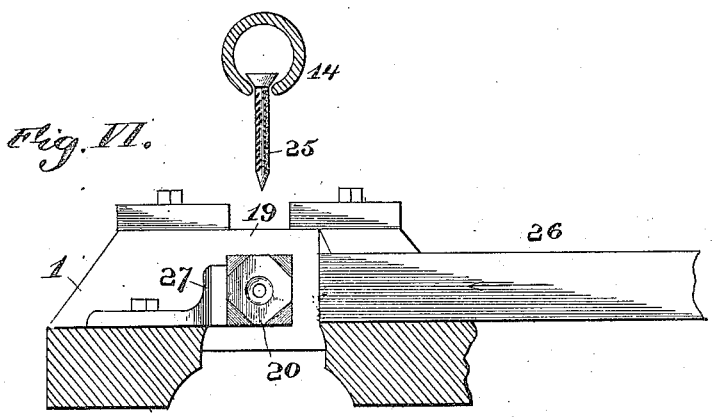
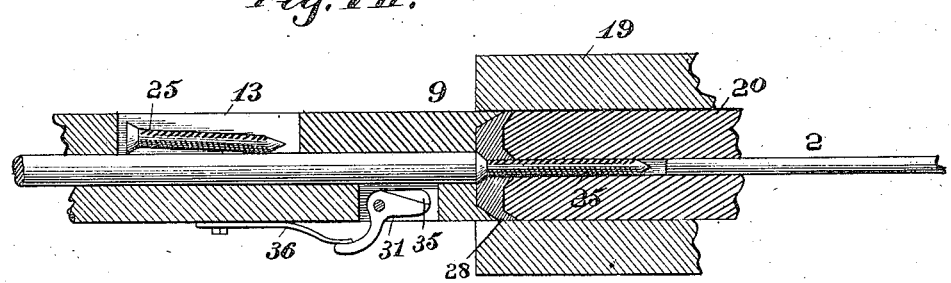
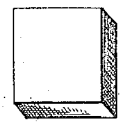
Fig. VIII.
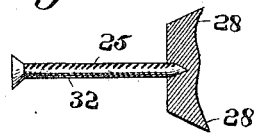
Fig. IX.
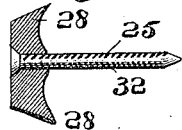
Fig. X.
Fig. XI.
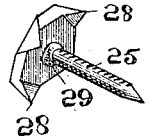
Fig. XII.
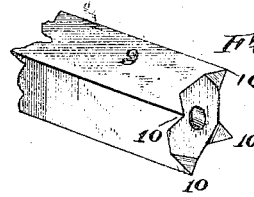
Fig. XIV.
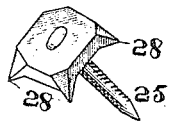
Fig. XIII.
Witnesses:
J. B. McGinn.
N. D. Bernhard.
Inventor:
Josiah W. Ells
By his Attorney
Joseph R. Edson

UNITED STATES PATENT OFFICE.

JOSIAH W. ELLS, OF PITTSBURG, PENNSYLVANIA, ASSIGNOR TO OSCAR KLEBER, HARRY KLEBER, AND HENRY BRAUN, ALL OF SAME PLACE.

MANUFACTURE OF NAILS.

SPECIFICATION forming part of Letters Patent No. 438,371, dated October 14, 1890.

Application filed December 10, 1889. Serial No. 333,295. (No model.)

*To all whom it may concern:*

Be it known that I, JOSIAH W. ELLS, a citizen of the United States, residing at Pittsburg, in the county of Allegheny and State of Pennsylvania, have invented a new and useful Improvement in the Art of Manufacturing Nails, of which the following is a full, clear, and exact description, reference being had to the accompanying drawings, forming part of this specification.

My present invention relates to the production of that class of shoe-nails commonly known to the trade as "hobnails," thus characterized by having a large protuberant head provided with a small attenuated stem or shank. Heretofore such nails were made entirely by hand, as no machine had been devised for that purpose, and it has long been the practice to form such nails by a slow and laborious process of hammering or forging the same from an iron rod after the manner well known to blacksmiths. So tedious is the work and limited the production that nails of this character command a very high price notwithstanding their roughness and irregular shape.

My present invention has for its object the production of hobnails, in which the head and shank are composed of two different pieces of metal firmly united to form a complete nail. This I accomplish by means of a suitable machine that will sever from a heated iron bar an imperforate blank of requisite size to constitute the intended nail-head and compress the same between properly-constructed dies to shape the head, and at the same time drive or force a pointed wire through the head or blank and leave it there as a shank to the hobnail. The entrance of the pointed wire into the red-hot blank spreads and turns the fibers thereof, forcing the same a short distance outward beyond the original surface of the head, forming a fillet immediately around the shank or wire, whereby it is given a deep and increased bearing in the head, which in cooling shrinks tightly on the wire and holds it immovably fast. A nail thus produced possesses all the requisites of one made of a single piece of iron, with the additional advantage of having a more uniform head, a parallel-sided, nicked, and pointed shank, which enables them to hold firmly in whatever they may be driven.

That others may fully understand the nature of my invention and the means whereby it is given practical form, I will proceed to describe the same by reference to the accompanying drawings, wherein—

Figure I represents a top view of a machine used in making my improved hobnails; Fig. II, a longitudinal vertical section through the middle portion of the entire machine; Fig. III, a detached perspective view of the male or cutting-off die; Fig. IV, a detached perspective view of the die-box wherein the nail-heads are compressed and given final form; Fig. V, a die contained within the die-box for giving form to the under side of the nail-heads; Fig. VI, an enlarged transverse section of the machine in a vertical plane directly fronting its die-box; Fig. VII, an enlarged longitudinal vertical section of the several dies that operate directly in forming the nails; Fig. VIII, an imperforate blank piece of metal intended for a nail-head; Fig. IX, a blank-head in section, with a pointed-wire nail partially through the same; Fig. X, the same blank with wire nail driven through it a proper distance; Fig. XI, top view of finished nail-head; Fig. XII, perspective view of a complete hobnail, showing the under side of its head; Fig. XIII, a perspective view of a complete hobnail, showing the outside and top portion of its head; Fig. XIV, an enlarged perspective view of the operative end of the reciprocating male die.

To make hobnails in accordance with my invention I prepare a machine consisting of a cast-iron frame 1, across one end of which is arranged, in suitable bearings, a strong shaft 2, fitted with an ordinary fly-wheel 3 and pulley 4, and near the middle portion with two cams or eccentrics 5 of unequal size and throw. Each cam is provided with a circumferential yoke, the smaller one of which is attached by means of a link 6 to a carrier 7, moving with a reciprocating rectilinear action in suitable guides 8. Within this carrier 7 is placed and firmly secured a detachable square punch or male die 9, having an angular-pointed tooth 10 at each of the four corners of its face. A round hole extends lengthwise and completely through this male die 9, and arranged therein is a stout steel rod 11, one end of which is connected by a suitable link 12 to the yoke of the larger cam 5, whereby the rod 11 is given a greater length of stroke than the die 9 wherein it moves. A narrow channel 13 is cut through the upper side of the carrier 7 and reciprocating die 9 into the longitudinal hole in which the rod 11 works.

Connected to the carrier 7, so as to form a continuation of the channel 13 leading thereinto, is an inclined chute 14, consisting of a tube slotted on its under side, which terminates in an oblong basin 15, supported by means of a pivoted link 16, that enables the chute and its basin to move back and forth with the carrier 7, by which they are kept in continual agitation. Above and so situate as to discharge its contents into this basin 15 is arranged a stationary hopper 17, sustained in that position by means of an iron brace 18, connecting the same to an immovable portion of the machine.

Nearer the rear portion of the main frame 1, and so as to be in perfect alignment with the reciprocating male die 9, is arranged and firmly secured a die-box 19, containing a detachable but fixed die 20, which has a longitudinal hole through it a little larger in diameter than the shank of a proposed nail, and this hole is countersunk or made slightly funnel-shaped at its forward end, and the corners of this end are cut obliquely off, whereby the face of the die is made octagonal.

In a suitable support directly behind the fixed die 20 is a tubular slide, wherein is secured a stiff steel rod 21, that projects into the fixed die 20, and is given a longitudinal reciprocating movement therein by means of an arm 22, provided with a long link 23, connecting the same with another arm 24, attached to the carrier 7, operated by the smaller cam.

The several parts of this machine having been properly adjusted and set in motion, the operation of making hobnails thereby is as follows: A quantity of pointed-wire nails 25 of suitable size are placed promiscuously in the hopper, whereupon some of them will drop directly into the basin 15 beneath, and by its agitation be shaken down the inclined tubular chute 14, their bodies falling through the slot therein, leaving them supported by their heads, whereby they all become arranged in the same position and deposited in the narrow channel 13, from which they are eventually dropped one by one in front of the reciprocating rod 11, which in rapid succession forces them out point foremost through the open end of the die 9. A bar of iron 26 of proper length, breadth, and thickness, having a considerable portion of one end thereof red hot, is then advanced hot end foremost across the face of the die-box 19 until the bar comes against the stop 27 on the opposite side of the machine. As the reciprocating male die 9 moves forward, it will sever a blank portion from the red-hot bar and carry it into the stationary die-box 19, at the same time bending the corners of the blank in such a manner as to form at each angle thereof a short pointed spur 28 and make both faces of the blank octagonal. At that instant the rod 11, with a quick thrust, forces a pointed-wire nail through the red-hot blank until the head of the wire nail becomes embedded therein. The action of the wire in passing through the hot blank is such as to cause its fiber to turn in the same direction, a portion being forced a short distance outward beyond the original plane of the iron into the funnel-shaped recess or conical mouth of the stationary die 20, by which a fillet 29 is formed around the shank of the nail so provided with an extraordinary head. As the dies open and recede for repeated action, the rod 21 in the stationary die 19 advances and forces the newly-headed nail out, whereupon it immediately falls into the receptacle or box 30, arranged to receive them.

A suitable device 31 is used in conjunction with the reciprocating die 9 and its inclosed rod 11 to properly guide and cause the pointed-wire nails to strike the exact center, each of its respective blank. This device 31 consists of a short lever, which is suitably pivoted in a slot in the carrier and provided with a V-shaped groove 35 in its forward end, which grooved end is pressed upward by means of a spring 36 and operates to lift the pointed end of the nail on a level with the axis of the rod 11, and thereby guide the nail in a direct line with said rod and cause the nails to enter the exact center of the blanks.

The wire nails are not only headed and pointed, but are provided in addition thereto with a series of transverse nicks, notches, or depressions 32 along their sides, and the supplied head on cooling becomes firmly embedded in such of the aforesaid nicks or notches as are inclosed within its grasp, making a perfect union of the two parts, whereby they are affixed solidly together.

The hobnails so produced possess a uniformly-shaped head provided with a pointed spur at each corner thereof to prevent a change of position or turn when used in a shoe-sole, and a parallel-sided, nicked, and pointed shank by which they easily penetrate hard leather and possess a better retentive hold in whatever they may be driven.

Although I have shown a nail provided with a shank round in cross-section, it is obvious that the same may be octagon, square, triangular, fluted, or plain without departing from the spirit of my invention.

Having thus fully described my invention, I claim—

1. A nail consisting of a shank having an integral head at one end and a series of nicks or notches and a supplemental protuberant head tightly shrunk upon the shank around the integral head and nicks or notches thereof, for the purpose described, substantially as set forth.

2. As a new article of manufacture, a nail consisting of a cylindrical shank of substantially uniform diameter and having an integral head at one end, a tapering point at its opposite end, and a series of notches or nicks in and along the face of the shank, and a supplemental protuberant head which is tightly shrunk upon the shank around the head and notches thereof and provided with spurs or projections at points adjacent to the shank, as and for the purpose described.

3. As a new article of manufacture, a nail consisting of a pointed shank having an integral head at one end and a series of nicks or notches in and along the face of the shank adjacent to the head thereof, a supplemental protuberant head tightly shrunk upon the shank around the head thereof, and a fillet or collar integral with the supplemental head and tightly shrunk upon the shank, as set forth.

4. As a new article of manufacture, a nail consisting of a cylindrical shank of substantially uniform diameter, having an integral head at one end, a point or taper at its opposite end, and a series of nicks or notches along the face of said shank, a toothed supplemental head shrunk tightly upon the shank around the head thereof and having an integral fillet or collar on its face which projects outwardly from the head and is shrunk tightly upon the nicked part of the shank, as and for the purpose described.

5. The art of manufacturing hobnails, consisting in cutting a flat imperforate blank from a heated bar of metal, forcing a headed shank centrally through said blank, compressing the blank upon and around the head of the shank and giving the blank the desired form or contour to provide a supplemental protuberant head to the nail, and allowing the heated blank or supplemental head to contract and shrink upon the shank and the head thereof, as and for the purpose described.

6. The art of manufacturing hobnails, substantially as described, consisting of cutting a flat imperforate blank from a heated bar of metal, forcing a pointed and headed shank centrally through the imperforate blank, with its pointed end foremost, subjecting said blank while in its heated state to compression between suitable dies to force the heated blank upon and around the shank and its head, and at the same time impart to the blank the desired configuration of a supplemental protuberant head of a nail, and finally allowing the heated blank to contract and shrink tightly upon the shank and its head, substantially as and for the purpose described.

7. The art of manufacturing nails, substantially as described, which consists in cutting an imperforate flat polygonal blank from a heated bar of metal, forcing a headed and pointed shank centrally through said heated blank, so that the head on the shank is substantially flush with the outer face of the blank, bending the angles or corners of the polygonal blank and compressing the same upon the shank and its head, and allowing the blank or head to contract and shrink tightly upon the shank and the head thereof, as and for the purpose described.

8. The art of manufacturing nails, which consists in cutting a flat imperforate blank from a heated bar of metal, forcing a pointed and headed shank centrally through the imperforate blank and turning the metal of the blank outward and around the shank to form a fillet underneath the supplemental protuberant head formed by the blank, subjecting said blank to compression between suitable dies to compress the blank upon the shank and its head and imparting to the blank the desired configuration, and allowing the supplemental head to contract and cool upon the shank and its head, substantially as described.

JOSIAH W. ELLS.

Witnesses:
SAMUEL JOHNSTON,
N. P. ROBERTS.